US005411787A

United States Patent [19]

Kulkarni et al.

[11] Patent Number: 5,411,787

[45] Date of Patent: May 2, 1995

[54] WATER BASED TRANSPARENT IMAGE RECORDING SHEET

[75] Inventors: Subodh K. Kulkarni, Woodbury; Jeffrey C. Chang, North Oaks, both of Minn.; Robert M. Henry, Round Rock, Tex.; Robert E. Martinson, West St. Paul; John J. Stofko, Jr., St. Paul, both of Minn.

[73] Assignee: Minnesota Mining and Manufacturing Company, St. Paul, Minn.

[21] Appl. No.: 139,219

[22] Filed: Oct. 19, 1993

[51] Int. Cl.[6] .......... B32B 3/00

[52] U.S. Cl. .......... 428/195; 428/206; 428/327; 428/447; 428/500; 428/688

[58] Field of Search .......... 428/195, 206, 327, 518, 428/520, 688, 447, 500

[56] References Cited

U.S. PATENT DOCUMENTS

| | | | |
|---|---|---|---|
| 4,148,637 | 4/1979 | Kubota et al. | 96/1.5 N |
| 4,317,123 | 2/1982 | Namiki et al. | 346/135.1 |
| 4,332,851 | 6/1982 | Hosomura et al. | 428/325 |
| 4,590,117 | 5/1986 | Taniguchi et al. | 428/212 |
| 4,684,561 | 8/1987 | Imai et al. | 428/141 |
| 4,686,549 | 8/1987 | Williams et al. | 503/227 |
| 4,775,658 | 10/1988 | Matsuda et al. | 503/227 |
| 4,819,010 | 4/1989 | Kohashi et al. | 346/76 PH |
| 4,847,237 | 7/1989 | Vanderzanden | 503/227 |
| 5,022,944 | 6/1991 | Swofford et al. | 156/244.11 |
| 5,064,722 | 11/1991 | Swofford et al. | 428/447 |
| 5,104,721 | 4/1992 | Sun | 428/206 |
| 5,104,731 | 4/1992 | Gager | 428/323 |
| 5,175,045 | 12/1992 | Henry et al. | 428/195 |
| 5,200,254 | 4/1993 | Henry et al. | 428/195 |
| 5,202,176 | 4/1993 | Higuchi et al. | 428/195 |
| 5,204,219 | 4/1993 | Van Ooij et al. | 430/272 |
| 5,310,591 | 5/1994 | Dodge et al. | 428/195 |
| 5,310,595 | 5/1994 | Ali et al. | 428/206 |

FOREIGN PATENT DOCUMENTS

| | | | |
|---|---|---|---|
| 0389200A2 | 9/1990 | European Pat. Off. | B41M 5/38 |

*Primary Examiner*—Patrick J. Ryan
*Assistant Examiner*—William A. Krynski
*Attorney, Agent, or Firm*—Gary L. Griswold; Walter N. Kirn; Darla P. Neaveill

[57] ABSTRACT

A water-based transparent image-receptive layer suitable for imaging in a thermal printer, and in electrophotographic or xerographic copiers, comprising a mixture of from about 5 parts to about 30 parts of at least one amino based silane coupling agent having the general formula:

$$(Q)_n R-Si(OR_1)_3$$

wherein Q is selected from the group consisting of primary, secondary and tertiary amino groups; R is selected from aliphatic and aromatic groups; $R_1$ is selected from the group consisting of alkyl and aryl groups, and n is 1 or 2; from about 60 parts to about 80 parts of basic colloidal particles; from about 10 to about 29.9 parts of a water-dispersible polymeric binder, and from about 0.1 part to about 5 parts of an antiblocking agent.

20 Claims, No Drawings

WATER BASED TRANSPARENT IMAGE RECORDING SHEET

BACKGROUND OF THE INVENTION

1. Field of the Invention

This invention relates to transparent recording materials suitable for use in thermal printers such as thermal mass transfer printers, and also suitable for use in electrographic and xerographic copiers. More specifically, it relates to coatings for color transparencies having a microstructured surface useful in overhead projectors and good image quality.

2. Description of the Art

Many different types of transparent image recordings sheets or "transparencies" as they are called in the industry, are known in the art. Transparencies can be made by different printing and imaging methods, such as thermal transfer printing, ink-jet printing and plain paper copying, e.g., electrography and xerography. All of these transparencies are suitable for use with overhead projectors.

In thermal mass transfer imaging or printing, an image is formed on a receptor sheet when a donor sheet or ribbon is brought in intimate contact with the receptor sheet and heated. Colored material on the donor sheet is selected by a computer operated thermal printhead having small, electrically heated elements, and the material is transferred from the donor sheet to areas of the receptor sheet in an image-wise manner. A full colored image is generated in at least 3 passes comprising yellow, cyan and magenta print cycles.

In copying procedures, the formation and development of xerographic images uses a toner composition comprised of resin particles and pigments are generally applied to a latent image generated on a photoconductive member. The image is then transferred to a suitable substrate, such as a transparent image receptor, and affixed thereon, by the application of heat, pressure, or combination thereof. These transparent image receptors generally comprise a polymeric substrate, such as polyethylene terephthalate, and have an image-receptive coating coated thereon for better toner adhesion.

U.S. Pat. No. 4,684,561 discloses a multilayer color sheet for thermal transfer printing comprising a substrate having a colorant layer on one side of the substrate and coated on the opposite side, a resin layer comprising at least one lubricating material and a polymer resin and fine particles of a solid material that render the surface of the resin layer irregular. It is disclosed that the anti-stick effect of the resin composition is more effective when two or more surface active agents, liquid lubricants and solid lubricants are used. The particles may be made of various materials, such as metals, inorganic materials and organic materials; preferred particles include synthetic amorphous silica, carbon black, alumina titanium oxide, calcium silicate, aluminum silicate and the like.

EP 389200A discloses a reusable, heat transfer recording ink sheet. The ink contains a colorant, a carrier and ethylene/vinyl acetate coated fine powder capable of being partially transferred to an ink-receiving recording medium for transfer recording. To ensure good printing repeatability, high print density, and good ink fixing, the EVA copolymer should have a number average molecular weight of no more than 30,000 and a vinylacetate content of from 18% to 45% of the copolymer.

U.S. Pat. No. 4,819,010 discloses a thermal transfer sheet having a heat-resistive base, a thermally transferable ink layer on one side of the base having auxiliary particles distributed therein such that they partially protrude from the surface, yielding an irregular surface. The sheet is disclosed to be useful in a wide range of applications, by modifying the particles to give desired physical properties in relation to the ink material. For example, the particles disclosed are capable of acting as a conductor of heat to adjacent ink portions.

U.S. Pat. No. 4,847,237 discloses a kit for thermal mass transfer printing. The kit includes an image-donating sheet and an image-receptive sheet. The donor-receptive sheet is disclosed to be capable of producing transparent images having clear, vivid colors when viewed in the projection mode. Waxes and other haze producing ingredients are eliminated from the image-donating sheet. Unlike typical systems, softening of the image-donating sheet is not required. Softening of the receptor sheet alone or of both sheets is disclosed to be efficacious.

U.S. Pat. No. 4,686,549 discloses a polymeric film receptor sheet for thermal mass transfer in which the receptive coating must be wax-compatible, have a softening temperature of from about 30° C. to about 90° C., and a higher critical surface tension than the donor material. The haze value of the receptor sheet must be less than 15%. Preferred coating compositions include polycaprolactones, chlorinated polyolefins, and block copolymers of styrene-ethylene/butylene-styrene.

U.S. Pat. No. 4,775,658 discloses a dye-receiving sheet for thermal transfer printing which is used in combination with a sublimable dye transfer sheet. The dye-receiving layer comprises a dye-receiving resin, a releasing agent, and a mixture of a silane copolymer and colloidal silica particles. The silane copolymers preferably have hydrolyzable groups which are able to react with the colloidal silicas. These groups include —OR and —OCOR, in which each R represents an alkyl group having from 1 to 2 carbon atoms, or a halogen such as Cl.

U.S. Pat. No. 5,175,045 discloses a receptor sheet for thermal mass transfer imaging with a polymeric image-receptive layer comprising a polymer having a melt transition onset no higher than the melting point of a compatible donor sheet wax, and having a melt viscosity at the melt temperature of the donor sheet wax of at least $1\times10^4$ poise. The receptor sheets are capable of producing transparent images having exceptionally small dots with no overprinting. This yields an image with highly improved clarity in the half tones area.

U.S. Pat. No. 5,200,254 discloses a receptor sheet manifold for thermal mass transfer imaging comprising a polymeric image-receptive layer on a substrate and a non-transparent backing sheet attached thereto. The receptive layer comprises an imaging polymer, a perfluoroalkylsulfonamidopolyether antistatic agent and silica particles. The backing sheet has a contact surface touching the receptor sheet of the manifold, and an opposing surface which is coated with a resin binder, an antistatic agent or agents, and a particulate, such that this opposing surface has a Bekk smoothness of about 450 to about 550 Bekk seconds.

U.S. Pat. No. 5,204,219 discloses the use of a gelled network of inorganic oxide particles on the polymeric surface of a substrate to provide a subbing layer having the potential for antistatic properties, antihalation properties and good coatability in photographic sheets having at least one silver halide emulsion layer over the subbing layer. This subbing layer also contains an ambifunctional silane, and may optionally contain a surfactant and about 0.1 to 5 weight percent of a polymeric binder, particularly a hydrophilic polymer binder to improve scratch resistance, or to reduce formation of particulate dust during subsequent use of the coated substrate. Use as an image-receptive layer is not disclosed.

U.S. Pat. No. 5,022,944 discloses in-line application of an aqueous solution containing hydrolyzed amino-silane primer to a polyester film at any suitable stage during manufacture of the film, prior to heat setting the film. The amino-functional silanes disclosed to be useful as a primer layer are diamino or triamino silanes responding in their unhydrolyzed state to the general formula:

$$(R^1)\ a\ Si\ (R^2)\ b\ (R^3)\ c$$

wherein $R^1$ is a functional group with at least one primary amino group, $R^2$ is a hydrolyzable group such as a lower alkoxy group, an acetoxy group or a halide, and $R^3$ is a non-reactive, non-hydrolyzable group such as a lower alkyl or a phenyl group; with a being greater than or equal to 1; b being greater than or equal to 1; and c being greater than or equal to zero with the sum of a+b+c being 4. Generally, the aminofunctional silane is hydrolyzed in water and applied to one or more surfaces of the oriented polyester film by any conventional in-line method such as spray coating or roll coating. The primed polyester coating is receptive to direct extrusion coating with one or more polymers.

U.S. Pat. No. 5,064,722 discloses the application of a hydrolyzed aminosilane primer to a polyester film wherein the silane has the general formula:

$$X\ Si\ (R^2)\ a\ (R^3)\ b$$

wherein X is a radical selected from the group consisting of $H_2NR^1HNR^1$, and $H_2NR^1HNR^1HNR^1$. The $R_1$s are the same or different groups selected from the group consisting of $C_1$ to $C_8$ alkoxy, an acetoxy or a halide; $R_3$ is a non-reactive, non-hydrolyzable group selected from the group consisting of $C_1$ to $C_3$ alkyl or phenyl; a is an integer ranging from 1 to 3; b is an integer ranging from 0 to 2 with the sum of a+b being 3.

U.S. Pat. No. 5,104,731 discloses a dry toner imaging film media having good toner affinity, anti-static properties, embossing resistance and good feedability through electrophotographic copiers and printers. The media comprises a suitable polymeric substrate with an antistatic matrix layer coated thereon which has resistance to blocking at 78° C. after 30 minutes and a surface resistivity of about $1\times10^8$ to about $1\times10^{14}$ ohms per square when measured at 20° C. and 50% relative humidity. The matrix contains a mixture of one or more thermoplastic polymers having a $T_g$ of 5° C. to 75° C., and at least one crosslinked polymer which is resistant to hot roll fuser embossing, at least one of the polymers being electrically conductive.

U.S. Pat. No. 5,104,721 discloses a medium for electrophotographic printing or copying comprising a polymeric substrate coated with a polymeric coating having a Tukon hardness of about 0.5 to 5.0 and a glass transition temperature of about 5° to 45° C. The coating comprises at least one pigment which provides a coefficient of static friction of from 0.20 to 0.80 and a coefficient of dynamic friction of from 0.10 to 0.40. The medium has improved image quality and toner adhesion. It is particularly useful in laser electrophotographic printing. The polymer employed in the coating can be thermosetting or thermoplastic resins, and are preferably aqueous acrylic emulsions such as Rhoplex™ resins from Rohm and Haas.

Although there are a host of recording sheets available for use in thermal mass printing and electrographic copying, there remains a need for new receptor sheets bearing coatings that enable the formation of high quality black and white or color images, with good scratch resistance, and feedability, low haze, good adhesion to the substrate and toner images, and which can be coated out of an aqueous medium.

The present inventors have now discovered an image-receptive layer that has good adhesion to the surface of a substrate, good adhesion to the donor surface during imaging, and also good adhesion to toners. This allows the image-receptive sheet to be effectively used in both thermal mass transfer printers and electrophotographic and xerographic copier machines. The layer produces a microstructured surface on the surface of the substrate for imaging, and is also scratch resistant.

This imaging layer can be coated out of an aqueous medium to produce a transparency imageable with a host of copiers and thermal printers, with good image quality, nonblocking properties, and feedability, and reduced solvent usage during manufacturing.

SUMMARY OF THE INVENTION

The present invention provides a water-based transparent image-receptive layer suitable for imaging in a thermal printer, or in electrophotographic or xerographic copiers, said layer having a thickness of at least about 0.20 μm, said layer comprising a mixture of:

a) from about 5 parts to about 30 parts of at least one amino functional silane coupling agent having the general formula:

$$(Q)_{\overline{n}}R-Si(OR_1)_3$$

wherein Q is selected from the group consisting of primary, secondary and tertiary amino groups; R is selected from aliphatic and aromatic groups; $R_1$ is selected from the group consisting of alkyl and aryl groups, and n is 1 or 2;

b) from about 60 parts to about 80 parts of basic colloidal particles;

c) from about 10 to about 29.9 parts of a water soluble or dispersible polymeric binder;

d) from about 0.1 part to about 5 parts of an antiblocking agent.

Preferred transparent image-receptive layers may also comprise up to about 5 parts of an antistatic agent.

In a highly preferred embodiment for optimum performance in a thermal printer, the water-based transparent image-receptive layer has a thickness of at least about 0.25 μm, comprising:

a) from about 5 parts to about 25 parts of at least one amino silane coupling agent selected from the group consisting of 3-aminopropyl-trimethoxysilane, 3-aminopropyltriethyoxysilane, addition products of 3-glycidoxypropylalkoxy silane and secondary hydroxy alkylamines, and mixtures thereof, b) from about 65 parts to about 80 parts of a basic colloidal silica particle, c) from about 10 to about 20 parts of a polyvinyl alcohol polymeric binder, and d) from about 0.1 to about 5 parts of an antiblocking particle selected from the group consisting of silica particles and polymeric beads.

The receptive layer can easily be coated out of an aqueous solution onto polymeric film substrates to provide image-receptive sheets or "receptors" of the invention.

The invention further provides for a receptor sheet suitable for use in both a thermal mass transfer printer and electrophotographic and xerographic copiers comprising a polymeric substrate having coated on at least one major surface thereof, the water-based transparent image-receptive layer described above.

Image-receptive layers of the invention have low haze and good scratch resistance. The scratch resistance can be improved even further by coating of a primer layer on the polymeric substrate prior to coating of the image-receptive layer.

As used herein these terms have the following meanings.

1. The term "image-receptive coating" means a coating which has been coated onto a substrate to improve the image-receptive nature thereof, and is used synonymously with "image-receptive layer".

2. The terms "image-receptive sheet" and "image receptor" and "receptor sheet" and like terms refer to a sheet having coated on at least one major surface thereof, an image-receptive coating of the invention.

3. The terms "antiblocking beads" and "antiblocking particles" are used interchangeably to mean any shape particulate antiblocking agent as otherwise described, having a minimum size of 0.25 μm.

4. The term "water-dispersible" when used to describe the polymeric binder includes those binders which are water-soluble.

5. The term "melt transition temperature" means the onset of melting as measured by Differential Scanning Calorimetry.

Unless specifically stated otherwise, all parts, percents and ratios disclosed herein are by weight.

DETAILED DESCRIPTION OF THE INVENTION

Image-receptive layers herein comprise at least one amino functional silane coupling agent having the following formula:

$$(Q)_{\overline{n}}R-Si(OR_1)_3$$

wherein Q is selected from the group consisting of primary, secondary and tertiary amino groups, preferably primary amino groups; R is selected from aliphatic and aromatic groups; $R_1$ is selected from the group consisting of alkyl and aryl groups, preferably an alkyl having from 1 to 10 carbon atoms; and n is 1 or 2.

Useful amino silanes include 3-aminopropyltrimethoxysilane, 3-aminopropyltriethyoxysilane, addition products of 3-glycidoxypropylalkoxy silane and secondary hydroxy alkylamines, and mixtures thereof.

These silanes can be further blended with other silane coupling agents including methyltrimethoxy silane, dimethyldiethoxy silane, methacrylolpropyl trimethoxy silane and dialkylamine addition products of the glycidoxypropylalkoxysilane, more preferably, tripropylamine addition products of the glycidoxypropyl dimethoxysilane.

The aminosilane coupling agent is present from about 5 parts to about 30 parts of the image-receptive layer, preferably from about 5 parts to about 25 parts, more preferably from about 5 parts to about 15 parts. At less than 5 parts, the coating layer formed tends to be hazy.

These amino silane coupling agents or blends are easily mixed with colloidal particles without destruction of the colloids to form a coating solution. Basic colloidal particles are present at levels of from about 60 parts to 85 parts, preferably from about 65 parts to 80 parts, more preferably from about 70 parts to 75 parts of the image-receptive layer. The colloidal particles useful in the present invention include colloidal silica particles such as nanometer sized silica particles in a basic environment, such as those available from Nalco Chemical Company as Nalco colloidal silicas 1030, 1115, 2327, 2326, 2329, 1130, 1140, 1040, 1050 and 1060, Ludox™ HS, LS, AS, AM, and SM colloidal silicas, available from DuPont; and SnowTex™ colloidal silicas such as ST-40, 50, C, N, S, XS and UP, available from Nissan Chemical Industry, Ltd., colloidal alumina sols such as Dispal™ 23N4-20, available from Vista Chemicals, and colloidal tin oxide sols such as Nyacol™ DP5730, available from Nyacol Products, Inc.

The average particle size of the basic colloidal particles is preferably less than 200 Å, and more preferably less than 70 Å.

Without wishing to be bound by theory, it is believed that the presence of the colloidal particles in the image-receptive layer gives the layer a microstructured surface with nanometer sized surface asperities, thereby providing good adhesion with the donor and inks during printing, and good toner adhesion for those used in copying machines. The microporosity, when used in conjunction with higher coating weights also yields increased insulative properties to the receptor sheets.

To improve the cohesive and adhesive properties of the receptive layer, a polymeric binder, particularly a water-dispersible polymer binder is present. The amount of the binder varies from about 10 parts by weight to about 29.9 parts of the layer, and for image receptors designed to be used in thermal printers, preferably from about 10 parts to about 20 parts. For image receptors to be used with xerography, the preferred limits may be higher if higher film stretchability is desired, e.g., for further processing after coating of the imaging layer, but should be monitored carefully to avoid decreasing the improved image properties.

Useful polymeric binders include polyvinyl alcohol; polyvinyl acetate, gelatin, polyesters, copolyesters, sulfonated polyesters, polyamides, polyvinylpyrrolidones, copolymers of acrylic acid and/or methacrylic acid, and copolymers of polystyrenes.

For use with thermal printers, the melting temperature of the polymeric binder is also important. In a preferred embodiment for use with thermal printers, the polymeric binder also has a melt transition onset no higher than the melting point of a donor sheet wax. This produces a receptor sheet capable of producing transparent images having exceptionally small dots with no overprinting. (Overprinting occurs when dots spread and merge in the half tone area.) This yields an image with highly improved clarity in the half tones area.

Preferred polymeric binders include polyvinyl alcohols (PVA), and water-soluble and water-dispersible sulfonated copolyesters such as described in U.S. Pat. No. 5,203,884, incorporated herein by reference, and AQ29, AQ35 and AQ55 sulfonated copolyesters, available from Eastman Kodak.

More preferably, binders are polyvinylalcohols having a weight average molecular weight (MW) of greater than 50,000, most preferably greater than 100,000. Commercially available PVAs include Airvol™ 165 (medium MW and superhydrolyzed PVA), Airvol™ 125 (medium MW and superhydrolyzed), and Airvol™ 540 (high MW and moderately hydrolyzed), all available from Air Products Company. However, because of the variety of counterions in the sols, some may react with certain polymeric binders and form a coagulant which cannot be coated. One skilled in the art can easily select the appropriate combinations and processing conditions to avoid such coagulation.

Particulate antiblocking agents are also present in the receptive layer. The purpose of these antiblocking particles is to give more uniform appearance to the receptor surface and to improve the feedability of the receptor sheets. Antiblocking particles also decrease the coefficient of friction, and thus lower the tendency of the coating to adhere to the underside of a receptor stacked thereover. This improves feeding by reducing multiple feeding tendencies.

Particles or "beads" useful as antiblocking agents in the present invention include polymeric particles such as polymethylmethacrylate (PMMA) and substituted PMMA beads, polyethylene beads, and beads comprising diol di(meth)acrylate homopolymers or copolymers of these diol di(meth)acrylates with long chain fatty alcohol esters of (meth)acrylic acid and combinations of at least one of the above.

Also useful are inorganic particles including silica particles such as Sipernat™ particles available from DeGussa, Syloid™ particles, available from Grace GmbH, Gasil™ 23F, available from Crosfield Chemicals, and the like, and ureaformaldehyde particles such as Pergopak™ M2, available from Ciba-Geigy Corporation.

Preferred particles include silica particles, PMMA particles and polymeric particles comprising a type of polymeric beads comprising the following polymerized composition:

a) from about 20 to 100% by weight of polymerizable diol di(meth)acrylate having the formula:

$$CH_2{=}CR^2COOC_nH_{2n}OOCR^2{=}CH_2$$

wherein $R^2$ is H or $CH_3$ and n is an integer of about 4 to about 18;

b) 0 to about 80% by weight of at least one copolymerizable vinyl monomer of the formula:

$$CH_2{=}CR^2COOC_mH_{2m+1}$$

wherein $R^2$ is H or $CH_3$; and m is an integer of about 12 to about 40; and c) 0 to about 30% by weight of at least one copolymerizable ethylenically unsaturated monomer selected from the group consisting of vinyl esters, acrylic esters, methacrylic esters, styrene, styrene derivatives, and mixtures thereof.

Examples of diol di(meth)acrylates include: 7,4-butanediol di(meth)acrylate, 1,6-hexanediol di(meth)acrylate, 1,8-octanediol di(meth)acrylate, 1,10-decanediol di(meth) acrylate, 1,12-dodecanediol di(meth)acrylate, 1,14-tetradecanediol di(meth)acrylate and mixtures thereof. Preferred monomers include those selected from the group consisting of 1,4-butanediol di(meth)acrylate, 1,6-hexanediol di(meth)acrylate, 1,12-dodecandediol di(meth)acrylate, 1,14-tetradecanediol di(meth)acrylate, and mixtures thereof.

Preferred examples of long chain fatty alcohol esters of (meth)acrylic acid include lauryl (meth)acrylate, octadecyl (meth)acrylate, stearyl (meth)acrylate, and mixtures thereof.

Ethylenically-unsaturated comonomers may be added to impart higher strength or higher Tg to the resulting copolymeric beads. Useful comonomers include vinyl esters such as vinylacetate, vinylpropionate, and vinyl pivalate; acrylic esters such as methylacrylate, cyclohexylacrylate, benzylacrylate, and isobornylacrylate, methacrylic esters such as methyl methacrylate, butylmethacrylate, cyclohexylmethacrylate, benzylmethacrylate, and ethylmethacrylate, alphamethylstyrenes and styrenes, vinyltoluene and mixtures thereof.

These antiblocking polymeric beads are generally produced by either one of two known suspension polymerization methods as described in U.S. Pat. Nos. 4,952,650 and 4,912,009, both of which are incorporated herein by reference, using thermal initiators that are oil-soluble and essentially water-insoluble, free radical initiators. These initiators include azo compounds such as 2,2'-azobis-2-methylbutyronitrile and 2,2'-azobis (isobutyronitrile), and organic peroxides such as benzoylperoxide and lauroyl peroxide.

Particularly preferred beads include poly(hexanedioldiacrylate/stearyl methacrylate), poly(butanedioldiacrylate/stearyl methacrylate), and poly(hexanedioldiacrylate/stearylmethacrylate/glycidyl (meth)acrylate.

Preferred beads have an average particle size distribution of from about 5 to about 15 μm. For particle sizes lower than the preferred range, more particles would be needed to produce the effective coefficient of friction reduction. However, the addition of more particles tends to also produce more haze which is undesirable for use with an overhead projector. For particles greater than 15 μm, thicker coatings would be required to anchor the particles firmly on the coatings, which can complicate the drying process and increase coating costs. Larger particles can also adversely affect the print quality of some print patterns. Therefore, the limit on the large particle size distributions affect the coating thickness more than the feeding performance of the film.

For receptors which are designed for use in a thermal printer, the addition of one size of beads is adequate, and the particle size range of the addition is not critical. However, for receptors to show good performance in a copier, the particles preferably have narrow particle size distributions, i.e., a standard deviation of up to 20% of the average particle size. These ranges are preferably 0.1–0.7 μm, 1–6 μm, 3–6 μm, 4–8 μm, 6–10 μm, 8–12 μm, 10–15 μm. More preferred particles are those having bimodal particles size distributions, i.e., a mixture of particles having 2 different particle size distributions such as 1–4 μm mixing with 6–10 μm to produce such a bimodal distribution.

When bimodal particles are used, both particles can be selected from the same preferred polymeric beads described above, or at least one such preferred beads and one selected from other beads such as polyethylene beads or other commercially available beads.

The most preferred bimodal particles are both selected from beads produced from the copolymer of hexanedioldiacrylate and stearylmethacrylate, having particle size distributions of about 1 to about 4 μm and from about 6 to about 10 μm, or from about 2 to about 6 μm and from about 8 to about 12 μm, or from about 0.2 to about 0.5 μm and from about 1 to about 6 μm.

Small amounts of antistatic agents can also be incorporated into the receptive layer to improve the antistatic properties to the layer. Useful antistatic agents include perfluoroalkylsulfonamidopolyether derivatives and quaternary ammonium salts. Preferred agents include addition products of perfluoroalkylsulfonyl fluoride, e.g., FX-8, available from 3M, and polyether diamines, e.g., Jeffamine™-ED series, available from Texaco Chemical.

Also useful are stearamidopropyldimethyl beta-hydroxyethylammonium nitrate and N,N-bis(2-hydroxyethyl)N-(3′dodecyl-2″ hydroxypropyl)methylammonium nitrate, both available from American Cyanamid as Cyastat™ SN and 609, respectively. The amount of antistatic agent present is preferably less than about 5% of the total image-receptive layer.

The thickness of the image-receptive layer is preferably greater than about 0.2 μm to be suitable for imaging in thermal mass transfer printing or in a copier. Preferably, for use in thermal transfer printers, the thickness of the image-receptive layer is greater than about 0.25 μm, The presence of required amounts of the binder resin is essential for producing these preferred coatings of the invention.

The image receptor further comprises a transparent substrate. The transparent substrate can be selected from any transparent polymeric film including polyester such as polyethylene terephthalate, polysulfones, polycarbonates, polystyrenes, acetates, polyolefins such as polyethylene and polypropylene and cellulose acetates, with polyethylene terephthalate (PET) film being preferred because of its thermal and dimensional stability. The caliper of the film ranges from about 25 μm to about 150 μm, preferably from about 75 μm to about 125 μm.

Adhesion of the image-receptive coating to the substrate is critical to the performance of the receptor. Transfer of a colorant from the donor to the image-receptive layer in thermal printing is effectual only if the anchoring of the image-receptive layer to the substrate is strong enough to hold the image-receptive layer thereon. In copying, anchoring of a toned image onto the image-receptive layer and subsequent fixing of the same is only considered effectual if the image-receptive layer remains anchored to the substrate.

The coating solution can also contain a surfactant to aid in improving the coatability. An aqueous coating solution of the image-receptive material of the present invention can be coated easily onto primed PET film to give clear coating with excellent adhesion. The resultant coating is insoluble in water and organic solvents and possesses good antistatic properties.

During imaging on either a printer or copier, the receptor is fed through the machine. The feeding motion and the repetition of the imaging cycles tend to scratch the receptor. Such scratches or abrasion marks can be visible when projected on a screen using an overhead projector, which is distracting and detracts from the professional appearance of a presentation. Improved scratch resistance of the image-receptive layer is therefore highly desirable, even though such marks do not render the receptor useless.

In addition to improving the cohesive and adhesive properties of the image-receptive layer as discussed previously, the choice of polymeric binder can also affect the scratch resistance of the layer. The preferred class of polymeric binders gives the receptors both improved scratch resistance, and resistance to fingerprinting.

To further improve the scratch resistance of the coating, the substrate can be first surface treated for better adhesion, or it can be chemically primed with priming agents. When PET is the substrate, useful priming agents include polyvinylidene chloride.

The receptor sheets of the present invention are useful in most commercial thermal printers and copiers, and may be produced in a variety of different embodiments. For some thermal printers, the receptor sheet may be produced with a paper sheet or 'tab', for facilitating feeding in some printers. Such a composite is commonly referred to in the industry as an imaging manifold.

An imaging manifold generally comprises of a polymeric image receptor sheet and an opaque backing sheet having a contact surface touching the non-imaging surface of the receptor sheet, and an opposing surface touching the image-receptive surface of a second receptor sheet in the stack. Such manifolds can be stack-fed through a thermal mass printer which has a multiple sheet feeding device. To further aid in feeding, a mixture of antistatic agents and a polymeric binder, can be coated onto this opposing surface of the backing sheet of the imaging manifold.

Some printers, however, may not require imaging manifolds, and good feedability without a 'tab' and lower multiple feeding tendencies can also be achieved if the side of the substrate opposite the image-receptive layer is coated.

The above invention is further illustrated by the following examples, which are nonlimiting in nature. Alternative embodiments within the scope of the claims may be imagined by one skilled in the art.

Test Methods

Print Quality

The print quality of imaged films is measured by the following procedure:

A sample of the film is printed with a specific image on a printer for which the film has been designed. The same image is then printed on a commercially available film for the same printer. The images are then visually compared by placing each film on an overhead projector which is set at 8 feet from a matte-finished front projection screen. The screen illumination is set at between 2000 and 2150 lumens. Each projected image is viewed from a distance of 10 feet. The following factors are considered; thin lines, small dots, small voids large solid fill areas, edge acuity, and color density. The above factors are rated as follows:

1-poor: significant loss of small dot and thin line printing;

2-good: comparable to commercial film sold for use with the same printer;

3-excellent: better print quality than commercial film for use for the same printer.

Scratch Resistance Test

A film is imaged on the thermal printer for which it is designed. A single line of black text is printed using a 3 or 4 colored ribbon, thus leaving the majority of the sheet image-free so that any scratches are easily seen.

Since each image is formed using at least 3 passes through the printer, the sheet is fed through the full printing cycle even though only black text is printed. After printing, the receptor is placed on an overhead projector which is set at 8 feet from a matte-finished front projection screen. The screen illumination is set at between 2000 and 2150 lumens.

The projected image is viewed from a distance of 10 feet and the scratches are noted and rated according to the following scale:

1 - no visible scratches present
2 - 0–4 non-objectionable marks
3 - 5–10 non-objectionable marks
4 - greater than 10 non-objectionable marks
5 - 1–2 objectionable marks
6 - more than 2 objectionable marks
7 - more than 10 objectionable marks

EXAMPLES

EXAMPLE 1

A receptor suitable for use with a thermal mass transfer printer was made in the following manner:

a) Preparation of the coating solution 27.32 g of Nalco 2326 (5 nm colloidal silica sol stabilized with ammonium counterion, available from Nalco Company), was added to 13.99 g of deionized water (DI). 0.49 g of 3-aminopropyltriethoxysilane (3-APS) was then added very slowly with constant stirring. After the mixture was stirred for 20 minutes to hydrolyze the 3-APS, 8.20 g of polyvinyl alcohol in a 5% aqueous solution (Airvol TM 165, available from Air Products) was added. Finally, 0.30 g of a 50% isopropyl alcohol solution of a reaction product of Jeffamine TM ED-900 and FX-8, available from 3M, and 0.75 g of 50/50 stearylmethacrylate hexanedioldiacrylate (SMA/HDDA) beads in 20% aqueous solution were added.

b) Preparation of a coated receptor sheet

The above coating solution was then hand coated onto a 90 μm polyvinylidene (PVDC) primed polyethylene terephthalate (PET) film using a #4 Mayer TM rod. The sheet was then dried in an oven at 110° C. for 2 minutes. The receptor was then printed using Tektronix Phaser TM II and Phaser TM 200 printers, and evaluated for print quality and scratch resistance. The results are shown in Table 1.

TABLE 1

| | |
|---|---|
| Print Quality | 3 |
| Scratch Resistance | 1 |
| Surface Conductivity ($10^{-8}$ amps) | 20 |

EXAMPLES 2–5

These examples were made in the same manner as Example 1, except that varying amounts of the ingredients were present, as shown in Table 2. These samples were also tested according to the test methods described above and the results are also shown in Table 2.

TABLE 2

| Ingred/Prop. | Ex 2 | Ex 3 | Ex 4 | Ex 5 |
|---|---|---|---|---|
| DI (g) | 33.3 | 35.6 | 22.69 | 8.26 |
| Nalco 2326 (g) | 9.95 | 10.93 | 18.23 | 24.88 |

TABLE 2-continued

| Ingred/Prop. | Ex 2 | Ex 3 | Ex 4 | Ex 5 |
|---|---|---|---|---|
| 3-APS (g) | 0.18 | 0.20 | 0.33 | 0.45 |
| Airvol TM 165 (g) | 6.57 | 3.28 | 8.75 | 16.42 |
| ED-900/FX-8 (g) | 0.12 | 0.12 | 0.21 | 0.30 |
| SMA/HDDA (g) | 0.30 | 0.30 | 0.53 | 0.75 |
| Print Quality | 3 | 3 | 3 | 3 |
| Scratch Resistance | 1 | 1 | 1 | 1 |
| Surface Conductivity ($10^{-8}$ amps) | 1.5 | 10 | 10 | 3.0 |

EXAMPLE 6–10

These were made in the same manner as Example 4, except that the Airvol TM 165 was replaced with other binders, as shown in Table 3. These receptors were also tested in the same manner as shown above and the results are also shown in Table 3.

TABLE 3

| Example No. | Binder Resin | Print Quality | Scratch Resistance | Surface Conduct. ($10^{-8}$ amps) |
|---|---|---|---|---|
| 6 | Airvol TM 125 | 3 | 1 | 10 |
| 7 | Airvol TM 540 | 3 | 1 | 10 |
| 8 | WB-54* | 3 | 6 | 10 |
| 9 | PVA (MW 18000) | 3 | 5 | 10 |
| 10 | PVA (MW 50,000) | 3 | 1 | 10 |

a sulfonated polyester made according to Example 6 of U.S. Pat. No. 5,203,884.

EXAMPLE 11

This receptor was made in the same manner as Example 7, except that the PET substrate was not primed prior to coating with the image-receptive layer. The scratch resistance measurement deteriorated to 5.

EXAMPLE 12C

This receptor was made in the same manner as Example 8, except that the PET substrate was not primed, as in Example 11. The scratch resistance rating on this layer deteriorated to 7.

EXAMPLE 13

This receptor was made by adding 0.5 g of Dispal TM 23N4-20, available from Vista Chemicals to 2.5 g of DI water. 5 g of a 5% aqueous solution of Airvol TM 540 and 0.5 g of a 20% aqueous solution os SMA-HDDA beads were then added to form a coating solution. This was handcoated onto a PVDC-primed 200 μm thick PET film using a #4 Mayer rod. The composite was then dried at 100° C. for 2 minutes. The film was printed on a Tektronix Phaser TM thermal printer. The print quality was found to be 3, and the scratch resistance rating was 2. The surface conductivity was $8\times10^{-8}$ amps.

EXAMPLE 14–19

These receptors were made in the same manner as Example 1, except with varying thicknesses as shown in Table 4. The solutions were all coated onto PVDC-primed 100 micrometer PET film using a pilot scale gravure process with in-line drying. Theses samples were tested according to the procedures above, and the test results are also shown in Table 4.

As can be seen, with the thinnest coatings of Examples 18 and 19, the print quality drops with the to 1 when imaged on a thermal printer, however, when imaged on a copier, the print quality is equal to commercial imaging sheets. This further shows that thicker imaging layers are required for good quality printing on thermal printers.

TABLE 4

| Ex/Ingred. (g) | 14 | 15 | 16 | 17 | 18 | 19 |
|---|---|---|---|---|---|---|
| DI water | 1052 | 1648 | 671 | 1648 | 2370 | 2520 |
| Nalco 2326 | 1805 | 1204 | 1644 | 1204 | 657 | 723 |
| 3-APS | 32.5 | 21.7 | 29.6 | 21.7 | 11.8 | 13.0 |
| Airvol TM 165 (Aldrich) | 542 | 578 | 1087 | 578 | 434 | 216 |
| ED900/FX-8 | 19.6 | 13.7 | 19.6 | 13.7 | 7.8 | 7.8 |
| SMA/HDDA Beads | 49.0 | 34.6 | 49.0 | 34.6 | 19.6 | 19.6 |
| Haze (%) | 1.3 | 1.0 | 1.8 | 1.0 | 1.2 | 1.0 |
| COF | .3 | .25 | .24 | .32 | .45 | .41 |
| Scratch | 4 | 4 | 3 | 4 | 4 | 4 |
| Surf. Cond. ($10^{-8}$ amps) | 24 | 9.7 | 4.4 | 10 | 1.6 | 29 |
| Coating Thickness (μ) | 0.5 | 0.35 | 0.5 | 0.35 | 0.2 | 0.2 |
| Image Qual. (Thermal Pr.) | 3 | 3 | 3 | 3 | 1 | 1 |
| Image Qual. (Copier) | — | — | — | — | 2 | 2 |

EXAMPLES 20C & 21–23

These receptors were made in the same manner as Example 17, except no antistatic agent was used and SMA/HDDA beads were either eliminated or replaced with other particles, as shown in Table 5. The print quality and scratch resistance tests were carried out and the results are also shown in Table 5. The sample without any particles exhibited colored interference patterns.

TABLE 5

| Ex/Ingred | 20C | 21 | 22 | 23 |
|---|---|---|---|---|
| Particles Size/Type | none | 5.5 μm SMA/HDDA | 8 μm SMA/GMA/HDDA | 8–15 μm Sipernat TM Silica |
| Haze | — | 2.9 | 1.9 | 4.4 |
| Scratch | 2 | 2 | 2 | 2 |
| Image Quality | 2 | 2 | 2 | 2 |

EXAMPLE 24

This receptor was made similar to Example 1, except with different ingredients, and without antistatic agent, as shown in Table 6. The sample was also tested accordingly and the results are shown in Table 7.

TABLE 6

| Ingred. | DI water | Nalco 2326 | APS | 5% sol. Airvol 125 | 20% sol. SMA/HDDA |
|---|---|---|---|---|---|
| Amt (g) | 36.2 | 100 | 1.8 | 66 | 3 |

TABLE 7

| Surf. Conduct. ($10^{-8}$ amps.) | Scratch Resist. | Haze | COF | Thickness (μm) | Image Quality |
|---|---|---|---|---|---|
| 17 | 1 | 1.3 | 0.4 | 0.5 | 3 |

EXAMPLE 25C

This receptor was made by adding 0.25 g of 3-APS to 15 g of Nyacol TM DP5730 (a 15% solids tin oxide sol, doped with antimony, available from Nycol Corp.) with constant stirring. 0.06 g of 8 μm SMA/HDDA beads dispersed in 5 g of water was then added followed by 10 g of a 5% aqueous solution of Airvol TM 125. This mixture coagulated within 5 minutes and could not be coated. This example demonstrates that with some sols, careful choice of polymer binder is required to in order to produce a coatable solution.

EXAMPLES 26–27

These receptors were made in the following manner:

a). Preparation of an addition product of diethanolamine and 3-glycidoxypropyltrimethoxysilane 23.6 g of 3-glycidoxypropyltrimethoxysilane (available from Huls America, inc. as A-187), and 10.5 g of diethanolamine (available from Aldrich Chemical Co.) were placed in a flask and stirred rapidly at room temperature to initiate the reaction. Initially, the reaction was heterogenous, but after about 5 to 10 minutes, a clear, one phase viscous liquid was formed. The mixture was stirred for about ½ an hour at room temperature, and then heated in a hot water bath for another ½ hour at 50° to 60° C.

After removal from the hot water bath, the liquid was stirred for an additional ½ hour before adding 115 g of water to the mixture to hydrolyze the methoxy groups. Assuming that all the methoxy groups are hydrolyzed, an approximately 20% solid solution of the coupling agent was produced.

b) Preparation of a coated receptor 1 g of the solution from a) was mixed with 15 g of Nyacol TM 5730 and 15 g of Nalco 2326, respectively to form Examples 26 and 27. To each of these mixtures was then added 0.06 g of 8 μm SMA/HDDA particles dispersed in 5 g of water, followed by 10 g of a 5% aqueous solutions of Airvol TM 125.

Each solution was then coated onto a 100 um thick PVDC primed PET film using a #4 Mayer rod. The coating was dried for 5 minutes at 110° C. to produce a clear, non-tacky film. The finished receptors were printed with a Tektronix Phaser TM 200 thermal printer. Print qualities of 1 and 3 and scratch resistance values of 5 and 2 were obtained for Examples 26 and 27, respectively.

EXAMPLE 28

This receptor was made in the same manner as Example 26, except that 5 g of a reactive dispersing agent was added to the coating solution prior to the addition of Airvol 125. The reactive dispersing agent was prepared in the following manner:

10 g of a 10% solution of Gantrez TM AN-139 (available from GAF Inc.) in methylethylketone was heated to about 50° C. in container 1, while 0.3 g of octadecylamine (available from Aldrich) dissolved in 9.7 g of acetone was heated to the same temperature in container 2. The contents of container 2 was added to the container 1 with stirring and the combined solution was allowed to react for about ½ hour without further heating. It was then poured into a solution of 1.2 g of 3-APS in 8.8 g of methanol and allowed to further react for another 5 minutes. This resultant solution was then diluted with 495 g of water and 5 g of ammonium hydroxide.

The image receptor was tested in the same manner as Example 26 and the print quality and scratch resistance value were measured to be 3 and 1 respectively.

EXAMPLE 29

This receptor was made and tested in the same manner as Example 27, except that 0.25 g of N-2-aminoethyl-3-aminopropyl-trimethoxysilane was substituted for 1 g of the addition product used in Example 27. The print quality and scratch resistance value were measured to be 3 and 1 respectively.

EXAMPLE 30

To 15 g of Nalco TM 2326 was added 0.25 g of 3-APS followed by 0.06 g of Syloid TM 161 (a wax treated amorphous silica with average particle sizes of 4 to 7 μm, available from W. R. Grace) dispersed in 5 g of the dispersing agent of Example 28. Finally, 10 g of a 5% solution of Airvol TM 125 was added and the solution was coated and tested in the same way as Example 28. The print quality and scratch resistance were measured to be 3 and 1 respectively.

EXAMPLES 31, 34–35, and 32C-33C

These receptors were made with the same antiblocking agents as in Example 30, but with 1 g of the reaction product of Example 26 and varying amounts and kinds of colloidal particles, as shown in table 8. These were also tested as in Example 30 and the results are also shown in Table 8.

Example 34 contains a polymeric binder which has a melting temperature which is higher than that of the other polymeric binders used, higher than the melting temperature of the wax on the donor sheet. This receptor shows good image quality when imaged using xerography, but poor image quality when imaged on a thermal printer.

The comparative experiments further demonstrate that certain combination of binder and colloidal sols were not compatible if mixed in the usual manner.

TABLE 8

| Ex./Ingred | 31 | 32C | 33C | 34 | 35 |
|---|---|---|---|---|---|
| Colloidal part. (g) | Nalco TM 2326 (15 g) | Nalco TM 1115 (15 g) | Snowtex TM UP (11 g) | Nalco TM 1115 (15 g) | Nalco TM 1115 (15 g) |
| Binder (g) | Airvol TM 125 (10 g) | Airvol TM 125 (10 g) | Airvol TM 125 (10 g) | AQ-55 (10 g) | WB-54 (10 g) |
| Haze | clear | hazy | hazy | clear | clear |
| Scratch Resistance | 1 | — | — | 5 | 5 |
| Print Qual (Thermal) | 3 | — | — | 1 | 3 |
| Print Qual (Copier) | — | — | — | 2 | — |

EXAMPLE 36

This was made by mixing 12 g of Nalco TM 2326 with 1 g of the reaction product of Ex. 26, followed by 15 g of Airvol TM 125 in 5% aqueous solution and 3 g of Nalco TM 2327. After adding 0.06 g of Syloid TM 161 dispersed in 10 g of the reactive Gantrez TM dispersing agent, the solution was coated in the same manner as Example 26 and tested.

A print quality of 2 and scratch resistance of 1 were obtained.

What is claimed is:

1. A water-based transparent image-receptive recording sheet comprising a substrate and a layer suitable for imaging in a thermal printer, and in electrophotographic or xerographic copiers, said layer having a microstructured surface, said surface having nanometer sized asperities, said layer having a thickness of at least about 0.20 μm, comprising a mixture of:

a) from about 5 parts to about 30 parts of at least one amino silane coupling agent having the general formula:

$$(Q)_{n}R-Si(OR_1)_3$$

wherein Q is selected from the group consisting of primary, secondary and tertiary amino groups; R is selected from aliphatic and aromatic groups; $R_1$ is selected from the group consisting of alkyl and aryl groups, and n is 1 or 2;

b) from about 60 parts to about 80 parts of basic colloidal particles, said particles having an average particle size of less than 200 Å;

c) from about 10 to about 29.9 parts of a water-dispersible polymeric binder;

d) from about 0.1 part to about 5 parts of an antiblocking agent.

2. A water-based transparent image-receptive layer a according to claim 1 wherein the amino silane is selected from the group consisting of 3-aminopropyltrimethoxysilane, 3-aminopropyltriethyoxysilane, addition products of 3-glycidoxypropylalkoxy silane and secondary hydroxy alkylamines, and mixtures thereof.

3. A water-based transparent image-receptive layer a according to claim 2 wherein said silane is blended with at least one other silane coupling agent selected from the group consisting of methyltrimethoxy silane, dimethyldiethoxy silane, methacrylolpropyl trimethoxy silane and dialkylamine addition products of glycidoxy propyl alkoxysilane.

4. A water-based transparent image-receptive layer a according to claim 1, wherein the silane comprises from about 5 parts to about 15 parts.

5. A water-based transparent image-receptive layer according to claim 1 wherein the colloidal particles are selected from the group consisting of colloidal silica particles, colloidal alumina particles and colloidal tin oxide particles.

6. A water-based transparent image-receptive layer according to claim 1 wherein said polymeric binder is selected from the group consisting of polyvinyl alcohol, polyvinyl acetate, gelatin, polyesters, copolyesters, sulfonated polyesters, polyamides, polyvinylpyrrolidones, copolymers of acrylic acid, copolymers of methacrylic acid, and copolymers of polystyrenes.

7. A water-based transparent image-receptive layer according to claim 1 wherein said antiblocking agent is a polymeric particle.

8. A water-based transparent image-receptive layer according to claim 7 wherein said polymeric bead comprises a polymer selected from the group consisting of poly(methyl methacrylate), poly(hexanediol-diacrylate/stearyl methacrylate), poly(butanediol-diacrylate/stearyl methacrylate), and poly(hexanediol-diacrylate/stearylmethacrylate/glycidylmethacrylate).

9. A water-based transparent image-receptive layer according to claim 7 wherein said beads have an average particle size distribution of from about 5 to about 15 $\mu$m.

10. A water-based transparent image-receptive layer according to claim 1 wherein said antiblocking agent is a silica particle.

11. A water-based transparent image-receptive layer according to claim 1 useful for imaging in copiers comprising a bimodal particle antiblocking agent comprising two polymeric beads having different average particle sizes, both being selected from beads produced from the copolymer of hexanedioldiacrylate and stearylmethacrylate, having particle size distributions of about 1 to about 4 $\mu$ and from about 6 to about 10 $\mu$.

12. A water-based transparent image-receptive layer according to claim 11 further comprising an antistatic agent selected from the group consisting of perfluoroalkylsulfonamidopolyether derivatives and quaternary ammonium salts.

13. A transparent image-receptive sheet suitable for imaging in electrophotographic or xerographic copiers, comprising a transparent substrate bearing on at least one major surface thereof, an image-receptive layer having a microstructured surface, said surface having nanometer sized asperities, said layer having a thickness of at least about 0.2 $\mu$m, comprising:

a) from about 5 parts to about 30 parts of at least one amino silane coupling agent having the general formula:

$$(Q)_n R—Si(OR_1)_3$$

wherein Q is selected from the group consisting of primary, secondary and tertiary amino groups; R is selected from aliphatic and aromatic groups; $R_1$ is selected from the group consisting of alkyl and aryl groups, and n is 1 or 2;

b) from about 60 parts to about 80 parts of basic colloidal particles, said particles having an average particle size of less than about 200 Å;

c) from about 10 to about 29.9 parts of a water-dispersible polymeric binder;

d) from about 0.1 part to about 5 parts of an antiblocking agent.

14. A transparent image-receptive sheet according to claim 13, said sheet being suitable for imaging in a thermal printer, said image-receptive layer having a thickness of at least 0.25 $\mu$m.

15. A transparent image-receptive sheet according to claim 14 wherein the amino silane is selected from the group consisting of 3-aminopropyl-trimethoxysilane, 3-aminopropyltriethyoxysilane, addition products of 3-glycidoxypropylalkoxy silane and secondary hydroxy alkylamines, and mixtures thereof.

16. A transparent image-receptive sheet according to claim 15 wherein said silane is blended with at least one other silane coupling agent selected from the group consisting of methyltrimethoxy silane, dimethyldiethoxy silane, methacrylolpropyl trimethoxy silane and dialkylamine addition products of glycidoxypropyl alkoxysilane.

17. A transparent image-receptive sheet according to claim 15 wherein the silane comprises from about 5 parts to about 15 parts.

18. A transparent image-receptive sheet suitable for imaging in thermal printers, and in electrophotographic or xerographic copiers, comprising a transparent substrate bearing on at least one major surface thereof, an image-receptive layer having a microstructured surface, said surface having nanometer sized asperities, said layer having a thickness of at least about 0.25 $\mu$m, comprising:

a) from about 5 parts to about 15 parts of at least one amino silane coupling agent selected from the group consisting of 3-aminopropyl-trimethoxysilane, 3-aminopropyltriethoxysilane, addition products of 3-glycidoxypropylalkoxy silane and secondary hydroxy alkylamines, and mixtures thereof, b) from about 65 parts to about 80 parts of basic colloidal silica particles, said particles having an average particle size of less than about 200 Å.

c) from about 10 to about 20 parts of a polyvinyl alcohol polymeric binder, and d) from about 0.1 to about 5 parts of an antiblocking particle selected from the group consisting of silica particles and polymeric beads.

19. A water-based transparent image-receptive layer according to claim 18 wherein said polymeric bead comprises a polymer selected from the group consisting of poly(methyl methacrylate), poly(hexanediol-diacrylate/stearyl methacrylate), poly(butanediol-diacrylate/stearyl methacrylate), and poly(hexanediol-diacrylate/stearylmethacrylate/glycidylmethacrylate).

20. A transparent image-receptive sheet according to claim 18 further comprising an antistatic agent selected from the group consisting of perfluoroalkyl-sulfonamidopolyether derivatives and quaternary ammonium salts.

* * * * *

UNITED STATES PATENT AND TRADEMARK OFFICE

CERTIFICATE OF CORRECTION

PATENT NO.: 5,411,787

DATED: May 2, 1995

INVENTOR(S): Subodh K. Kulkarni, Jeffrey C. Chang, Robert M. Henry, Robert E. Martinson and John J. Stofko, Jr.

It is certified that error appears in the above-identified patent and that said Letters Patent is hereby corrected as shown below:

Column 3, Line 42, "$R_1$s" should read --$R^1$s--.

Column 5, Line 68, "tripropylamine addition products" should read--dipropylamine addition products--.

Column 12, Line 51, "Aqueous solution os" should read --aqueous solution of--.

Signed and Sealed this

Fifteenth Day of July, 1997

Attest:

BRUCE LEHMAN

Attesting Officer

*Commissioner of Patents and Trademarks*